3,326,879
POLYMERIZATION OF OLEFINIC HYDROCARBONS IN THE PRESENCE OF VOCl₃ AND AS AN ACTIVATOR AN AROMATIC COMPOUND
Noboru Yamada, Keizo Shimada, and Toshio Takemura, Yamaguchi-ken, Japan, assignors to Teijin Limited, Osaka, Japan, a corporation of Japan
No Drawing. Filed Feb. 12, 1964, Ser. No. 344,216
Claims priority, application Japan, Feb. 25, 1963, 38/8,439; Apr. 18, 1963, 38/19,804; Apr. 25, 1963, 38/21,059; July 6, 1963, 38/35,813, Oct. 11, 1963, 38/54,268
2 Claims. (Cl. 260—93.7)

This invention relates to a process for polymerization of one or more olefinic hydrocarbons. Again this invention provides a process for polymerization of one or more of unsaturated hydrocarbons with the aid of novel ionic polymerization catalysts.

It is known that monoolefins having not less than three carbons such as propylene, isobutylene and 2-methyl-butene-1; conjugated diolefins such as butadiene and isoprene; and unsaturated, cyclic hydrocarbons having a vinyl-bond such as styrene and α-methylstyrene are polymerized with the aid of various catalysts to yield resinous or oily polymers. Those known polymerization processes include, for example, radical polymerization using peroxide catalysts; ionic polymerization using Friedel-Crafts catalysts such as anhydrous aluminium chloride, or such catalysts as alkali metals or alkylates of alkali metals; and further, processes using so-called Ziegler-type catalysts.

This invention provides a process for polymerization of the unsaturated hydrocarbons in the presence of vanadium oxychloride (VOCl₃) or vanadium tetrachloride (VCl₄) as the catalyst. It is understood that the polymerization reaction of the unsaturated hydrocarbons in accordance with the invention is promoted by a certain type of cationic polymerization mechanism. However, presumably the reaction proceeds with an entirely new polymerization mechanism different from heretofore known chemical mechanisms of cationic polymerization. The discovery of the process of the invention is believed to open the way for development of new academic field relating to chemical mechanisms of polymerization. In the past, polymerization of unsaturated hydrocarbons by means of Friedel-Crafts catalysts such as, for example, anhydrous aluminium chloride or tin tetrachloride is generally known as cationic polymerization. For instance, isobutylene is known to be polymerizable with the aid of anhydrous aluminium chloride. Isobutylene polymerizes in a non-polar organic solvent, for example, a saturated hydrocarbon such as n-heptane, with the aid of anhydrous aluminium chloride. In contrast to this, with vanadium oxychloride isobutylene does not appreciably polymerize. On the other hand, conjugated diolefins such as isoprene or unsaturated cyclic hydrocarbons such as styrene can be polymerized, also in non-polar organic solvents, by anhydrous aluminium chloride, however at a low rate of polymerization. Whereas, in the presence of vanadium oxychloride, those unsaturated hydrocarbons are polymerized very quickly. Thus, the catalytic action of vanadium oxychloride is markedly different from those of Friedel-Crafts catalysts represented by anhydrous aluminium chloride.

The invention is based on the surprising discovery that although monoolefins such as isobutylene do not polymerize to any substantial degree with the aid of vanadium oxychloride or vanadium tetrachloride, they can be readily and smoothly polymerized by means of vanadium oxychloride or vanadium tetrachloride, in the presence of aromatic hydrocarbons such as naphthalene or derivatives thereof, or of sulfides having at least one carbon to sulfur double bond, such as carbon disulfide.

M. Szwarc polymerized styrene and butadiene using naphthalene adducts of sodium as the catalysts and formed so-called living polymers (Nature, 178, 1168, 1956). His polymerization reaction mechanism is assumed to be such that, by the action of sodium radical anion of naphthalene is formed, and further electron transfer to the monomer such as styrene takes place to form radical anion of the monomer, thus promoting the polymerization. The catalytic action of vanadium oxychloride or of vanadium tetrachloride in the invention well resembles that of the sodium as above-described, but is different in the point that the latter uses cationic polymerization mechanism. This fact is well proven by the fact that isobutylene can be polymerized in accordance with the invention. That is, in the invention presumably the polymerization is initiated by the formation of radical cation caused by electron transfer. Until date, such typical cation radical-initiated polymerization is not known. That such electron transfer takes place can be inferred because of the color change in the reaction system. For example, n-heptane solution of vanadium oxychloride is yellow. Upon addition of naphthalene thereto, it changes to green, and further with addition of a monomer such as isobutylene or styrene, to dark red and the polymerization takes place.

This phenomenon is entirely the same to the color change accompanying the electron transfer between sodium-naphthalene adducts and styrene as observed by Szwarc. In case of polymerizing isobutylene with the aid of anhydrous aluminium chloride, such color change is not observed.

The chemical mechanism of the cation-radical polymerization initiated by electron transfer is presumed to be as follows, taking the example of polymerization of isobutylene by vanadium oxychloride-naphthalene catalyst.

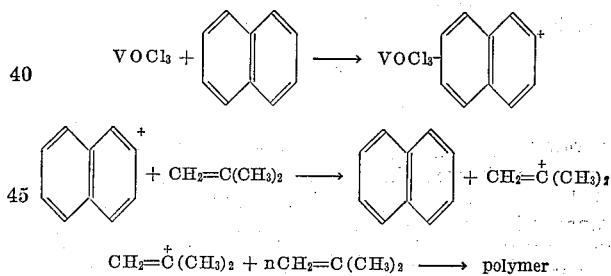

$CH_2=\overset{+}{C}(CH_3)_2 + nCH_2=C(CH_3)_2 \longrightarrow$ polymer

Again generally in cationic polymerization of isobutylene using Friedel-Crafts catalyst, the lower the reaction temperature, the greater the rate of polymerization. Whereas in the polymerization reaction of the invention, the lower the reaction temperature, the less becomes the rate of polymerization. From these points also it can be understood that the process of the invention is basically different from the conventional polymerization processes of unsaturated hydrocarbons using Friedel-Crafts catalysts.

The invention relates to a process for polymerization of unsaturated hydrocarbons using as the catalyst vanadium oxychloride or vanadium tetrachloride in the presence of aromatic hydrocarbons and derivatives thereof, or sulfides having at least one carbon to sulfur double bond.

Those unsaturated hydrocarbons polymerizable by the process of the invention are olefinic hydrocarbons of three or more carbon atoms. Those olefinic hydrocarbons include propylene, n-butene-1, isobutylene, isopentene, pentene-1, hexene-1, isohexene and various methyl-, ethyl-, and propyl-substituted 1-olefins of 4–10 carbon atoms; and certain 2-olefins such as butene-2 and 2-methylbutene-2. The invention is particularly suited to polymerize olefinic hydrocarbons of 3–10 carbon atoms.

The catalysts used in the invention are vanadium oxychloride having the molecular formula of VOCl$_3$ and vanadium tetrachloride having the molecular formula of VCl$_4$. Generally, vanadium oxychloride include many compounds represented by the formulae VOCl$_3$, VOCl$_2$, VOCl and V$_2$O$_2$Cl. However, the "vanadium oxychloride" useful in the invention is the compound represented by the formula VOCl$_3$. Therefore it is to be understood that "vanadium oxychloride" throughout the specification and claims refers to the compound of the formula VOCl$_3$. While those compounds of the formulae VOCl$_2$, VOCl and V$_2$O$_2$Cl are all solid at room temperature, the vanadium oxychloride of the formula VOCl$_3$ used in the invention is a yellow liquid at room temperature, which decomposes reacting with water or alcohols and has a boiling point of 126–127° C.

Again generally vandium chloride includes various compounds represented by the formulae VCl$_4$, VCl$_3$ and VCl$_2$, among which that of the formula VCl$_4$ being the only vanadium chloride useful for the invention. While vanadium chlorides of the formulae VCl$_3$ and VCl$_2$ are all solid at room temperature, vanadium tetrachloride of the formula VCl$_4$ used in the process of the invention is a dark red liquid at room temperature, and decomposes reacting with water and alcohols.

In the process of the invention, the catalyst is mixed with an activator in an organic solvent before being used for the polymerization reaction. The activator includes aromatic hydrocarbons and derivatives thereof and sulfides having at least one carbon to sulfur double bond. The aromatic hydrocarbons include benzene, toluene, xylene, diphenyl, diprenyl ethane, tripenyl ethane, fluoren, α-methyl napthalene, β-methyl napthalene, acenaphthene, acenapthylene, phenanthrene, anthracene, and other derivatives of benzene, napthalene and anthracene. Among the many derivatives of aromatic hydrocarbons, nitrogen compounds, sulfur compounds and oxy-compounds are particularly useful as the activator. "Nitrogen compounds of aromatic hydrocarbons" means aromatic amines, nitro compounds or nitriles. However in the process of the invention, among the organic amine compounds represented by the general formula

(in which R, R' and R" may be same or different members selected from the group consisting of hydrogen, alkyl and aromatic hydrocarbon groups) those amine compounds having at least one aromatic hydrocarbon group are particularly preferred. For example, those may be named are: aniline and derivatives thereof such as methyl aniline, dimethyl aniline, ethyl aniline, diethyl aniline, p-toluidine, dipenyl amine; α-napthyl amine and β-napthyl amine and their derivatives such as phenyl-β-naphthyl amine and dinapthyl amine. As the aromatic sulfur compounds may be named are, for example, thiophenol, thiocresol, alkyl phenyl mercaptans such as ethyl-, propyl-, butyl-, amyl-, hexyl-, octyl-, nonyl-, decyl-, phenyl-mercaptans, and aromatic thioethers such as alkyl phenyl thioethers and dibenzothiophene. Besides the foregoing, compounds having a napthalene ring such as thio-α-napthol are also included in this class. As the aromatic oxy-compounds, there are, for example, aromatic ketones such as acetophenone, benzophenone, α-acetyl naphthalene, β-acetyl napthalene, 2-benzoyl pyridine, 3-benzoyl pyridine and 4-benzoyl pyridine; aromatic alcohols such as phenol, benzyl alcohol, α-naphthol and β-naphthol; aromatic ethers such as α-naphthyl methyl ether, β-naphthyl methyl ether and benzyl ether; aromatic esters such as benzyl benzoate and methyl benzoate; and aromatic organic acids such as benzoic acid. As the compounds having at least one carbon to sulfur double bond, there are, for example, carbon disulfide, zinc ethyl phenyl dithiocarbamate, diphenyl thiocarbazone, dimethyl thiourea, tetramethyl thiuram monosulfide and tetramethyl thiuram disulfide. These many compounds may be used singly or in combination as the activator of the catalyst.

In the process of the invention, the mixing of the catalyst with the activator and the polymerization reaction of the unsaturated hydrocarbons are performed in an organic solvent. Any solvent may be used for the purpose so far as it is inert to the catalyst and the activator. As organic solvent, for example, inert hydrocarbons such as hexane, heptane and octane, or halogenated hydrocarbons such as methylene chloride, ethyl chloride, chloroform and carbon tetrachloride are suitable for use. However, in certain cases the activator used may function also as the solvent, and therefore the use of the solvent as mentioned in the above is not essential, for example, when aromatic hydrocarbons such as benzene and toluene or carbon disulfide are used. In the invention, both the unsaturated hydrocarbons and organic solvents used should be substantially anhydrous, in order to avoid decomposition of the catalysts.

The polymerization of olefinic hydrocarbons in accordance with the invention can be carried out at any temperatures ranging from −110° to 100° C., preferably from −80° to 40° C.

The amount of the catalyst used in the invention, that is, vanadium oxychloride or vanadium tetrachloride, can range from 0.1–10% by weight, preferably 0.5–5%, to the total weight of the polymerization system containing the olefinic hydrocarbon and the solvent. Again generally use of 0.1% or more, in terms of mol percent to vanadium oxychloride or vanadium tetrachloride used, of activator is effective for the purpose of the invention. The preferred range is 1–50%. Some types of activators sometimes prevent polymerization when added in an amount exceeding 100%. Such types of compounds are aromatic amines, aromatic oxy-compounds, aromatic sulfur compounds and sulfides having at least one carbon to sulfur double bond, except carbon disulfide.

In order to assist understanding of the invention, the invention will be illustrated as to the case of polymerization of isobutylene.

In the absence of water and oxygen, in an organic solvent a mixed catalyst of vanadium oxychloride and naphthalene is dissolved, to which isobutylene is added and allowed to polymerize at temperatures ranging from −110 to 100° C., preferably from −80° to 40° C. When the monomer is added to the catalyst system, the color of the solution changes from deep green to dark red. The reaction pressures may be any or normal, elevated, or reduced pressure. After completion of the reaction, alcohol is added to the polymeric mixture to stop the polymerization. Upon decomposition of the catalyst thus by the addition of alcohol, white or light green polymer is obtained from the liquid polymerization mixture. As the alcohol may be used in this case, there are, for example, methyl, ethyl, isopropyl, n-propyl, isobutyl and n-butyl alcohols. Thus obtained polymer is amorphous, is soluble in organic solvents such as benzene, toluene and n-heptane and useful as a material for plastics, synthetic rubber, adhesives and paints. Further the foregoing polymerization operations are equally applicable to polymerization of olefinic hydrocarbon other than isobutylene.

The process of the invention will now be explained with reference to the following examples.

*Example 1*

A pressure bottle of 100 cc. capacity was charged with an ampoule filled with 5 millimols of vanadium oxychlorire, 30 cc. of n-heptane and 5 millimols of purified naphthalene (activator). After replacing the air with nitrogen and further reducing the pressure, the ampoule of vanadium oxychloride was broken and the content, mixed with the purified naphthalene. Thereupon the liquid became deep green. Then the polymerization system was cooled with Dry Ice-methanol, followed by introduction thereinto of 0.447 mol (25.06 g.) of isobutylene monomer. Immediately thereafter the entire system was put in a path of 0° C. and the polymerization was initiated. The reaction liquid became dark red. The polymerization was continued for 20 hours at a temperature of 0° C. After completion of the polymerization, the reaction mixture was poured into 500 cc. of cold methanol. The rubbery polymer thus precipitated on the bottom of the vessel was taken out, washed several times with methanol and dried under a reduced pressure. A light green, rubbery polymer resulted in an amount of 24.80 g., corresponding to 99.0% yield.

*Examples 2–8*

The results of experiments carried out under the similar procedures as in Examples 1 above were as shown in the table below.

TABLE 1

| Example No. | Solvent (cc.) | Monomer (g.) | Catalyst (millimol) | | Polymerization conditions | | Yield | Observation |
|---|---|---|---|---|---|---|---|---|
| | | | $VOCl_3$ | Activator naphthalene | Temp. (° C.) | Time (hour) | | |
| 2 | n-Heptane (30) | Isobutylene (25.0) | 5 | 1.0 | 0 | 20 | 96.0 | Rubberlike polymer. |
| 3 | do | do | 5 | 2.0 | −78 | 60 | 93.8 | Hard, rubberlike polymer. |
| 4 | do | do | 5 | 0.5 | −78 | 60 | 90.5 | Rubberlike polymer. |
| 5 | do | 2-methylbutene-1 (20.0). | 5 | 5.0 | 0 | 40 | 12.0 | Soft, rubberlike polymer. |
| 6 | Carbon tetrachloride (30). | Isobutylene (25.0). | 5 | 1.0 | −10 | 20 | 92.6 | Rubberlike polymer. |
| 7 | Chloroform (30) | do | 5 | 2.0 | −10 | 20 | 91.5 | Do. |
| 8 | n-Heptane (30) | Isobutylene (25.0), 2-methylbutene-1 (20.0). | 10 | 2.0 | 0 | 30 | 62.6 | Mixture of rubbery polymers. |

*Example 9*

Propylene was polymerized with the aid of a mixed catalyst system composed of 10 millimols of vanadium oxychloride and 5 millimols of naphthalene, under the same polymerization operations and post-polymerization treatments as employed in Example 1. The polymerization was continued for 50 hours at 30° C., and white, tacky polypropylene was obtained at a yield of 57.5%.

*Example 10*

A pressure bottle of 100 cc. capacity was charged with an ampoule filled with 5 millimols of vanadium oxychloride, 50 cc. of n-heptane and 2 millimols (0.356 g.) of anthracene and its inside air was replaced with dry nitrogen. When the ampoule was broken and the catalyst was mixed with anthracene, the polymerization system became deep green. Then, the pressure was reduced and the system was cooled to −78° C., into which 18.08 g. of isobutylene was introduced by distillation. Immediately thereafter the temperature of the system was raised to 0° C., and at that temperature the monomer was allowed to polymerize for four hours. During progress of the polymerization, the system showed dark red color. After completion of the polymerization, the reaction mixture was poured into 500 cc. of cold methanol, and thereby precipitated rubbery polymer was separated, which was further purified by redissolving in n-heptane and precipitated from cold methanol. Polyisobutylene in an amount of 18.33 g. was obtained. The polymerization yield was 97.5%.

*Example 11*

15.0 grams of 3-methylbutene-1 was polymerized in the presence of 5 millimols of vanadium oxychloride and 1 millimol of fluorene, under the same operational conditions and post-polymerization treatments as employed in Example 10. The polymerization was performed at 0° C. for 30 hours, yielding white, soft rubber-like poly-3-methylbutene-1. The yield was 5.5%.

*Example 12*

20 grams of 4-methylpentene-1 was polymerized in the presence of a mixed catalyst composed of 5 millimols of vanadium oxychloride and 1 millimol of acenaphthylene under the same operational conditions and post-polymerization treatments as employed in Example 10. After 30 hours of polymerization at 0° C., 2.4 g. of oil, tacky polymer was obtained.

Into the system 9.8 g. of isobutylene monomer was introduced, the temperature of the system was raised to 0° C., and immediately the polymerization was started. After an hour's reaction, the polymeric mixture was poured into 500 cc. of methanol to decompose the catalyst and precipitate the polymer.

The polymer precipitated on the bottom of the vessel was separated, redissolved in n-heptane and poured into methanol. By repetition of the procedure the polymer was purified. Thus well purified polymer was dried under reduced pressure, to yield 9.75 g. of white, rubbery polymer.

*Example 13*

Into a pressure bottle of 100 cc. capacity, 30 cc. of n-heptane, 5 millimols of vanadium oxychloride and 1 millimol of diphenyl amine were charged and caused to form a complex compound in nitrogen gas, whereby dark blue precipitate being produced. The reaction system was then centrifuged to separate liquid phase from solid phase. First, half the amount of the solid phase was taken and added with 30 cc. of n-heptane. Into the mixture isobutylene was introduced and subjected to polymerization conditions for four hours at 0° C. without forming any polymer. Then the liquid phase only was used for polymerization of 14.5 g. of isobutylene for an hour at 0° C., to yield 3.0% polymer. Last, to the remaining half of the solid phase 5 millimols of vanadium oxychloride was newly added, and further in the presence of 30 cc. of n-heptane the mixture was used to polymerize 16.0 g. of isobutylene for an hour at 0° C. Polyisobutylene was obtained at the yield of 98.0%. Further, the polymerization operations and the post treatments were all similar to those in Example 1.

*Example 14*

A pressure bottle of 100 cc. capacity was charged with 50 cc. of n-heptane, an ampoule filled with 5 millimols of vanadium oxychloride ($VOCl_3$) and 5 millimols of carbon disulfide. Thereafter the air inside the polymerization system was replaced with nitrogen and the ampoule was broken so that the vanadium oxychloride could react with carbon disulfide. The solvent system turned orange red. Then the entire system was cooled to −78° C. with Dry Ice-methanol and its inside pressure was reduced, followed by introduction into the system of 10.0 g. of isobutylene by distillation method. Immediately thereafter the system was polymerized for 5 hours while maintaining the temperature of 0° C., during which the system becoming deep red. After completion of the polymerization the polymeric mixture was poured into about 500 cc. of cold methanol so as to decompose the catalyst and precipitate the polymer. The rubbery polyisobutylene deposited on the bottom of the vessel was taken out, redissolved in n-heptane and precipitated from cold methanol. By repetition of those steps the polymer was refined. After the thorough refining the polymer was dried under reduced pressure and the polymerization yield was calculated to be 95.5%.

*Example 15*

Under the operational conditions exactly the same as in Example 1, in a pressure bottle of 100 cc. capacity 10.0 g. of isobutylene was polymerized in the presence of 50 cc. of n-heptane with the aid of a dark green catalyst mixture of 5 millimols of vanadium oxychloride and 5 millimols of dibenzothiophene. The polymerization conditions were at 0° C. for 20 hours. During the progress of the polymerization, the system became brown. The yield was 92.4%.

*Example 16*

After the manner of Example 15, 20 g. of butene-2 was polymerized with the aid of 3 millimols of vanadium oxychloride and 3 millimols of β-naphthol. As the solvent n-heptane was used. At the yield of 3.9%, a tacky, oily polybutene-2 was obtained, after the polymerization at 0° C. for 20 hours.

*Example 17*

A pressure vessel for polymerization use of 100 cc. capacity was charged with 50 cc. of n-heptane, an ampoule filled with 5 millimols of vanadium oxychloride (VOCl$_3$) and 5 millimols of β-naphthol, and its inside air was replaced with dry nitrogen. Thereafter the ampoule of vanadium oxychloride was broken, and the content was reacted with β-naphthol to turn the solvent system blackish purple. The entire system was then cooled to −78° C. by means of Dry-Ice-methanol bath, and at a reduced pressure 0.23 mol of isobutylene was introduced thereinto. Immediately the polymerization started and was continued for 7 hours while the temperature was maintained at 0° C. After completion of the polymerization, similar post treatments as in Example 1 were performed to form a rubbery polyisobutylene at a yield of 98.5%.

*Example 18*

Under the same operational conditions as in Example 1, 0.23 mol of isobutylene was polymerized at 0° C. for 30 hours, using 50 cc. of n-heptane as the solvent in the presence of a mixed catalyst of 3 millimols of vanadium oxychloride and 1 millimol of β-naphthyl methyl ether. The polymerization system became blackish purple. A rubbery polymer was obtained at a yield of 58.5%.

*Examples 19–53*

Under the same operations as in Example 1, the process of the invention was experimented using various monomers, catalysts, activators and solvents with varied polymerization conditions. The results are given in the table below.

TABLE 2

| Example No. | Solvent (cc.) | Monomer (g.) | Catalyst (millimol) | | Polymerization conditions | | Yield | Observation |
|---|---|---|---|---|---|---|---|---|
| | | | V-compound | Activator | Temp. (°C.) | Time (hour) | | |
| 19 | CCl$_4$ (50) | IB (21.4) | VOCl$_3$ (5) | Anthracene (1.0) | 0 | 2 | 94.5 | Rubber-like polymer. |
| 20 | n-Hep. (50) | 2-MB (17.5) | do | Anthracene (2.0) | do | 10 | 17.2 | Soft, rubber-like polymer. |
| 21 | do | IB (18.8) | do | Fluorene (2.0) | −30 | do | 34.6 | Rubber-like polymer. |
| 22 | do | do | do | Fluorene (0.5) | do | do | 77.7 | Do. |
| 23 | do | do | do | Fluorene (0.05) | do | do | 11.9 | Do. |
| 24 | CCl$_4$ (50) | IB (15.5) | do | β-Methylnaphthalene (0.5) | 0 | 5 | 83.9 | Do. |
| 25 | n-Hep. (50) | IB (17.4) | do | Phenanthrene (0.5) | do | 10 | 85.7 | Do. |
| 26 | do | IB (15.5) | do | Acenaphthylene (0.5) | do | 3 | 66.8 | Do. |
| 27 | ECl (50) | IB (10.0) | VCl$_4$ (5) | Fluorene (1.0) | 0 | 1 | 55.0 | Rubber-like polymer. |
| 28 | CCl$_4$ (50) | 2-MB (15.0) | VOCl$_3$ (5) | Fluorene (2.0) | −30 | 10 | 18.1 | Do. |
| 29 | n-Hep. (50) | IB (15.5) | do | α-Methylnaphthalene (0.5) | 0 | 5 | 89.5 | Do. |
| 30 | do | do | do | Acenaphthene (0.5) | do | 3 | 72.4 | Do. |
| 31 | do | IB (11.5), 2-MB (12.25) | do | Phenanthrene (1.0) | do | 30 | 51.0 | Tacky polymer. |
| 32 | do | IB (16.4) | VOCl$_3$ (10) | Diphenylamine (5.0) | do | do | 86.0 | Rubber-like polymer. |
| 33 | n-Hep. (30) | IB (15.5) | do | β-Naphthyl amine (1.0) | do | 12 | 96.4 | Do. |
| 34 | n-Hep. (50) | IB (16.4) | do | Diphenyl amine (1.0) | do | 1 | 99.5 | Do. |
| 35 | do | IB (18.0) | VOCl$_3$ (5) | do | −30 | 2 | 90.0 | Do. |
| 36 | do | 2-MB (13.1) | do | do | do | 30 | 4.9 | Tacky polymer. |
| 37 | n-Hep. (30) | IB (18.0) | do | Phenyl-β-naphthyl amine (0.1) | 0 | do | 74.4 | Rubber-like polymer. |
| 38 | do | do | do | do | −30 | do | 60.6 | Do. |
| 39 | n-Hep. (30) | do | do | Phenyl-β-naphthyl amine (0.05) | 0 | 30 | 62.2 | Do. |
| 40 | do | do | do | do | −78 | 5 | 51.1 | Do. |
| 41 | n-Hep. (50) | IB (10.0) | do | Aniline (1.0) | do | 20 | 74.0 | Do. |
| 42 | do | do | do | CS$_2$ (5) | −78 | 20 | 31.1 | Do. |
| 43 | do | do | do | CS$_2$ (50) | 0 | 5 | 96.8 | Do. |
| 44 | do | do | do | do | −78 | 20 | 32.9 | Do. |
| 45 | do | do | do | Dibenzothiophene (1.0) | do | do | 91.5 | Do. |
| 46 | do | do | do | Dibenzothiophene (0.1) | do | do | 88.2 | Do. |
| 47 | CCl$_4$ (50) | do | do | Dibenzothiophene (5.0) | 0 | do | 58.5 | Do. |
| 48 | n-Hep. (50) | do | do | Zn-EPh-DTC (1.0) | do | do | 99.5 | Do. |
| 49 | do | do | do | Zn-EPh-DTC (0.5) | do | do | 60.7 | Do. |
| 50 | n-Hep. (50) | do | do | Thio-β-naphthol (0.10) | 0 | 20 | 12.5 | Do. |
| 51 | do | do | do | β-Naphthol (1.0) | do | 7 | 58.5 | Do. |
| 52 | do | do | VOCl$_3$ (3) | do | do | 25 | 97.8 | Do. |
| 53 | do | do | do | Phenol (1.0) | do | 20 | 51.0 | Do. |

Note.—In the above: CCl$_4$ stands for carbon tetrachloride; n-Hep. for n-heptane; IB for isobutylene; 2-MB for 2-methylbutene-1; Zn-EPh-DTC for zinc ethyl phenyl dithiocarbamate; ECl for ethyl chloride.

What is claimed is:

1. Process for polymerization of at least one aliphatic monoolefin having 3 to 10 carbon atoms, characterized in that said polymerization is carried out in the presence of both a catalyst consisting of $VOCl_3$ and at least one activator selected from the group consisting of aromatic hydrocarbons, aromatic amines, aromatic sulfur compounds, aromatic oxy-compounds and compounds having at least one carbon-to-sulfur double bond, said activator being present in an amount of at least 0.1 mole percent to $VOCl_3$; said aromatic hydrocarbon being selected from the group consisting of benzene, toluene, xylene, diphenyl, diphenyl ethane, triphenyl ethane, flouren, α-methylnaphthalene, β-methylnaphthalene, acenaphthene, acenaphthylene, phenanthrene and anthracene; said aromatic amine being selected from the group consisting of aniline, methyl aniline, dimethyl aniline, ethyl aniline, diethyl aniline, para-toluidine, diphenylamine, α-naphthyl amine, β-naphthyl amine, phenyl-β-naphthylaniline and dinaphthylamine; said aromatic sulfur compound being selected from the group consisting of thiophenol, thiocresol, alkylphenylmercaptan and alkylphenylthioether whose alkyl groups have 2–10 carbon atoms, dibenzothiophene, and thio-α-naphthol; said aromatic oxy-compound being selected from the group consisting of acetophenone, benzophenone, α-alkylnaphthalene, β-acetylnaphthalene, 2-benzoylpyridine, 3-benzoylpyridine, 4-benzoylpyridine, phenol, benzyl alcohol, α-naphthol, β-naphthol, α-naphthylmethyl ether, β-naphthylmethyl ether, benzylether, benzylbenzoate, methyl benzoate and benzoic acid; said compound having at least one carbon-to-sulfur double bond being selected from the group consisting of carbon disulfide, zinc ethyl phenyl dithiocarbamate, diphenyl thiocarbazone, dimethyl thiourea, tetramethyl thiuram monosulfide and tetramethyl thiuram disulfide.

2. Process according to claim 1 wherein said polymerization is carried out at a temperature from $-110°$ C. to $110°$ C., using 0.1 to 10 percent, based on the weight of the total reaction system, of a catalyst consisting of $VOCl_3$ in the presence of at least one activator of claim 1.

References Cited

UNITED STATES PATENTS

| | | | |
|---|---|---|---|
| 2,085,535 | 6/1937 | Langedijk | 260—94.3 |
| 3,075,026 | 1/1963 | Banks | 260—94.9 |
| 3,236,824 | 1/1966 | Wilhjelm | 260—94.9 |
| 3,251,815 | 5/1966 | Yamada et al. | 260—94.3 |

JOSEPH L. SCHOFER, *Primary Examiner.*

E. J. SMITH, *Assistant Examiner.*